US008840452B2

(12) United States Patent
Han (10) Patent No.: US 8,840,452 B2
(45) Date of Patent: Sep. 23, 2014

(54) AIR CONDITIONER FOR VEHICLE (75) Inventor: Seongseok Han, Daejeon-si (KR)

(73) Assignee: Halla Visteon Climate Control Corporation (KR)

( * ) Notice: Subject to any disclaimer, the term of this patent is extended or adjusted under 35 U.S.C. 154(b) by 335 days.

(21) Appl. No.: 13/088,458

(22) Filed: Apr. 18, 2011

(65) Prior Publication Data

US 2011/0263191 A1 Oct. 27, 2011

(30) Foreign Application Priority Data

Apr. 27, 2010 (KR) .................. 10-2010-0038967
Aug. 23, 2010 (KR) .................. 10-2010-0081201

(51) Int. Cl.
*B60H 1/00* (2006.01)
*B60H 1/26* (2006.01)

(52) U.S. Cl.
CPC ................. *B60H 1/00692* (2013.01)
USPC ........................................................ 454/145

(58) Field of Classification Search
USPC ........................ 454/121, 127, 145
See application file for complete search history.

(56) References Cited

U.S. PATENT DOCUMENTS

| 5,676,595 | A  | * | 10/1997 | Sumiya et al. .............. 454/121 |
| 6,569,009 | B2 | * | 5/2003  | Nishikawa et al. .......... 454/121 |
| 6,612,922 | B2 | * | 9/2003  | Uemura et al. .............. 454/121 |
| 6,669,549 | B2 | * | 12/2003 | Uemura et al. .............. 454/156 |
| 6,688,964 | B2 | * | 2/2004  | Uemura et al. .............. 454/121 |
| 6,811,481 | B2 | * | 11/2004 | Uemura et al. .............. 454/69 |
| 7,371,161 | B2 | * | 5/2008  | Goupil et al. ................ 454/156 |
| 7,527,551 | B2 | * | 5/2009  | Goupil et al. ................ 454/121 |
| 7,658,671 | B2 | * | 2/2010  | Balzo et al. .................. 454/152 |
| 7,857,041 | B2 | * | 12/2010 | Fukagawa et al. ........... 165/202 |
| 7,878,235 | B2 | * | 2/2011  | Park et al. .................... 165/204 |
| 8,113,268 | B2 | * | 2/2012  | Stevenson .................... 165/42 |
| 2001/0008148 | A1 | * | 7/2001  | Ito et al. .................. 137/625.46 |
| 2002/0146976 | A1 | * | 10/2002 | Nishikawa et al. .......... 454/152 |
| 2002/0197951 | A1 | * | 12/2002 | Uemura et al. .............. 454/121 |
| 2003/0013404 | A1 | * | 1/2003  | Uemura et al. .............. 454/121 |
| 2003/0171091 | A1 | * | 9/2003  | Uemura et al. .............. 454/156 |
| 2003/0232590 | A1 | * | 12/2003 | Okumura et al. ........... 454/121 |
| 2004/0043720 | A1 | * | 3/2004  | Uemura et al. .............. 454/156 |
| 2005/0118944 | A1 | * | 6/2005  | Vincent et al. ............... 454/121 |
| 2006/0046632 | A1 | * | 3/2006  | Goupil et al. ................ 454/121 |
| 2006/0046633 | A1 | * | 3/2006  | Goupil et al. ................ 454/121 |
| 2006/0223431 | A1 | * | 10/2006 | Park et al. .................... 454/156 |
| 2007/0144727 | A1 | * | 6/2007  | Hirayama et al. ........... 165/203 |
| 2009/0197517 | A1 |   | 8/2009  | Wang et al. |

FOREIGN PATENT DOCUMENTS

CN      1153112 A     7/1997
CN    101495332 A     7/2009

(Continued)

*Primary Examiner* — Steven B McAllister
*Assistant Examiner* — Jonathan Cotov
(74) *Attorney, Agent, or Firm* — Fulbright & Jaworski LLP (57) ABSTRACT The present invention relates to an air conditioner for a vehicle, which has a mode door of a single plate member including a first door portion that closes at least two vents, a second door portion that closes one vent, and bridge portions that connect the first door portion and the second door portion with each other, thereby opening and closing a plurality of vents by the single mode door, reducing the number of components, weight and manufacturing costs by simplifying the entire structure of the mode door because it uses the single plate member, reducing the size of the air conditioner, preventing bad smells caused by inhabitation of molds and being reusable due to the use of the single plate member, and preventing the door from being caught because the plate member has bent portions formed at end portions thereof.

14 Claims, 12 Drawing Sheets

(56) References Cited

FOREIGN PATENT DOCUMENTS

| JP | 11020452 A | 1/1999 |
|---|---|---|
| JP | 2004017920 A | 1/2004 |
| JP | 2004-203310 A | 7/2004 |
| JP | 2004-216929 A | 8/2004 |
| KR | 100207560 B1 | 4/1999 |
| KR | 20010029367 A | 4/2001 |
| KR | 1020060076553 A | 7/2006 |

* cited by examiner

PRIOR ART

AIR CONDITIONER FOR VEHICLE

RELATED APPLICATIONS

This application claims priority under 35 U.S.C. §119 from Korean Patent Application No. 10-2010-0038967 filed Apr. 27, 2010 and Korean Patent Application No. 10-2010-0081201 filed Aug. 23, 2010, each of which are incorporated herein by reference in its entirety for all purposes.

BACKGROUND OF THE INVENTION

1. Field of the Invention

The present invention relates to an air conditioner for a vehicle, and more particularly, to an air conditioner for a vehicle, which has a mode door of a single plate member including a first door portion that closes at least two vents, a second door portion that closes one vent, and bridge portions that connect the first door portion and the second door portion with each other.

2. Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the inside air or the outside air into the air conditioner, heating or cooling the introduced air, and blowing the heated or cooled air into the vehicle.

According to mounted structures of a blower unit, an evaporator unit and a heater core unit, such an air conditioner is classified into a three-piece type air conditioner where the blower unit, the evaporator unit, and the heater core unit are disposed independently, a semi-center type air conditioner where the evaporator unit and the heater core unit are embedded in an air-conditioning case and the blower unit is mounted separately, and a center-mounting type air conditioner where the three units are all embedded in the air-conditioning case.

Recently, an independent type air conditioner, which separately and independently provides air of different temperatures to a driver's seat and to a passenger's seat inside the vehicle to thereby individually heat and cool the seats according to the driver's or the passenger's need, has been disclosed.

Figure 1:
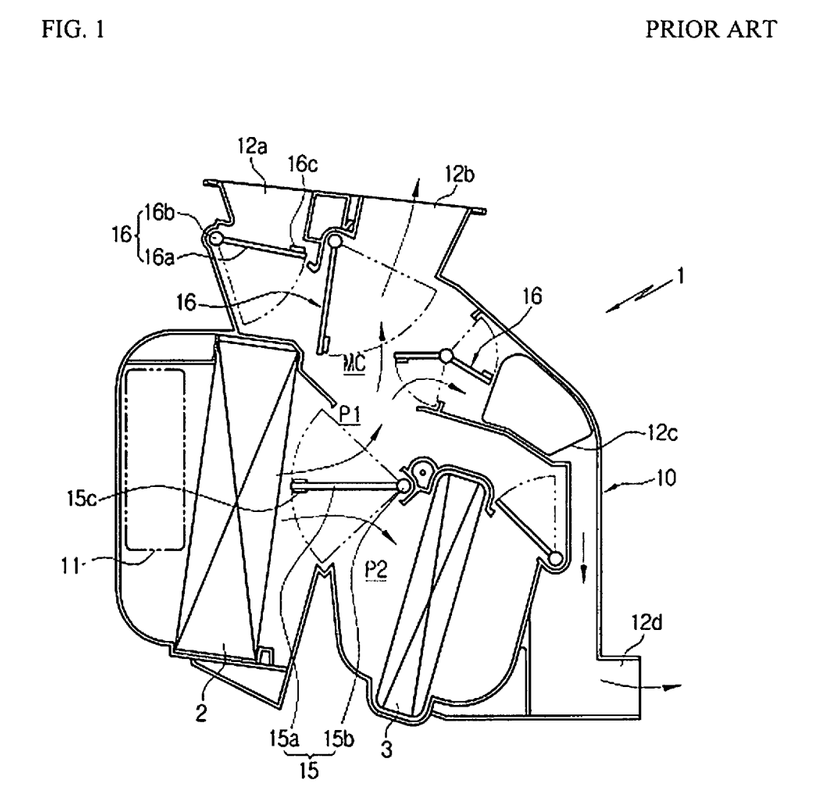
FIG. 1 is a sectional view of an air conditioner for a vehicle according to a prior art.

FIG. 1 illustrates the semi-center type air conditioner. In FIG. 1, the air conditioner 1 includes: an air-conditioning case 10 having an air inflow port 11 formed on an inlet thereof and a defrost vent 12a, a face vent 12b and floor vents 12c and 12d mounted on an outlet thereof in such a way as to be adjusted in degree of openings by mode doors 16; a blower (not shown) connected to the air inflow port 11 of the air-conditioning case 10 for sending inside air or outside air; an evaporator 2 and a heater core 3 that are mounted on air passageways in the air-conditioning case 10; and a temperature-adjusting door 15 mounted between the evaporator 2 and the heater core 3 for adjusting the degree of opening of a cold air passageway P1, which bypasses the heater core 3, and a warm air passageway P2, which passes through the heater core 3.

Furthermore, the floor vents 12c and 12d are divided into a floor vent 12c for a front seat and a floor vent 12d for a rear seat.

Moreover, the temperature-adjusting door 15 and the mode doors 16 respectively include rotary shafts 15b and 16b rotatably mounted on both side walls of the air-conditioning case 10 and plates 15a and 16a formed at one side of the rotary shafts 15b and 16b. In this instance, for the mode door 16, a center pivot door having the plates 16a formed at both sides of the rotary shaft 16b may be used.

The temperature-adjusting door 15 and the mode doors 16 are respectively connected to a cam (not shown) or a lever (not shown), which is actuated by an actuator (not shown) mounted on an outer surface of the air-conditioning case 10, and rotatably operated to thereby adjust the degree of opening of the cold and warm air passageways P1 and P2 or adjust the degree of opening of a passageway directing the vents 12a to 12d.

Figure 2:
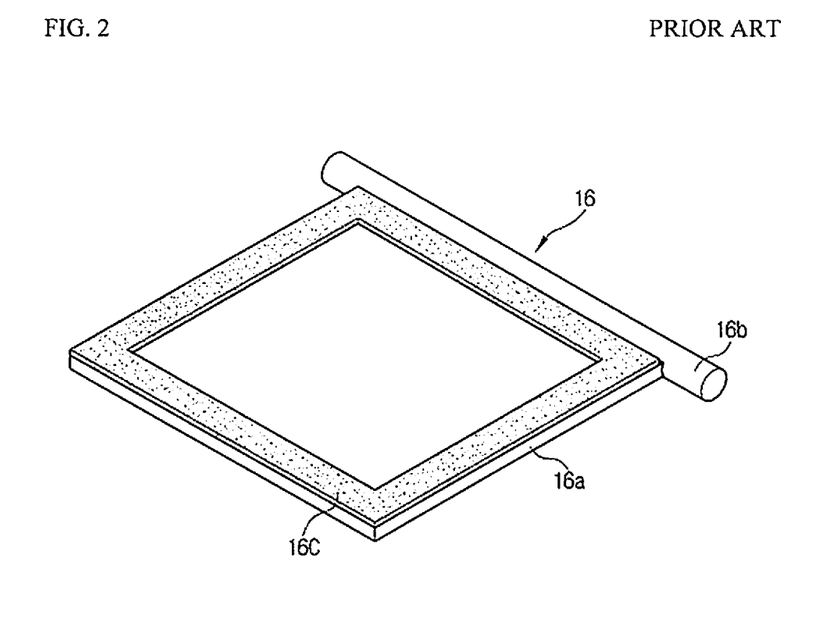
FIG. 2 is a perspective view of a mode door of FIG. 1.

In addition, as shown in FIGS. 1 and 2, the temperature-adjusting door 15 and the mode doors 16 further include sealing members 15c and 16c attached to the edges of the plates 15a and 16a. The sealing members 15c and 16c are in close contact with the air-conditioning case 10 to improve sealability when the doors 15 and 16 close the corresponding passageways.

According to the air conditioner 1 having the above structure, in the case of the greatest cooling mode, the temperature-adjusting door 15 opens the cold air passageway P1 and closes the warm air passageway P2. Accordingly, the air blown by a blower (not shown) is converted into cold air by heat-exchanging with refrigerant flowing inside the evaporator 2 while passing through the evaporator 2, and then, flows toward a mixing chamber (MC) through the cold air passageway P1. After that, the converted air is discharged to the inside of the vehicle through the vents 12a to 12d opened by a predetermined air-conditioning mode, whereby the inside of the vehicle is cooled.

Moreover, in the case of the greatest heating mode, the temperature-adjusting door 15 closes the cold air passageway P1 and opens the warm air passageway P2. Accordingly, the air blown by the blower (not shown) passes through the evaporator 2, is converted into warm air by heat-exchanging with cooling water flowing inside the heater core 3 while passing through the heater core 3 through the warm air passageway P2, and then, flows toward the mixing chamber (MC). After that, the converted air is discharged to the inside of a vehicle through the vents 12a to 12d opened by the predetermined air-conditioning mode, whereby the inside of the vehicle is heated.

In the meantime, in the case of a half cooling mode, the temperature-adjusting door 15 is rotated to a neutral position, and opens all of the cold air passageway P1 and the warm air passageway P2 relative to the mixing chamber (MC). Accordingly, the cold air passing through the evaporator 2 and the warm air passing through the heater core 3 flow toward the mixing chamber (MC) and are mixed with each other, and then, are discharged to the inside of the vehicle through the vents 12a to 12d opened by the predetermined air-conditioning mode.

As shown in FIG. 2, the mode door 16 has a sealing member 16c to increase sealability, but has a problem in that it generates a bad smell because of inhabitation of molds on the sealing member 16c.

Furthermore, since the sealing member 16c mounted on the mode door 16 is very expensive and requires much time to mount it to the mode door 16, the manufacturing price is increased.

Moreover, since the plate 16a of the mode door 16 has a predetermined thickness to allow mounting of the sealing member 16c, the mode door 16 is very heavy and needs great material costs by weight.

Additionally, it is difficult to reuse the mode door 16 because it is made of at least two materials.

SUMMARY OF THE INVENTION

Accordingly, the present invention has been made to solve the above-mentioned problems occurring in the prior arts, and it is an object of the present invention to provide an air conditioner for a vehicle, which has a mode door of a single plate member including a first door portion that closes at least two vents, a second door portion. that closes one vent, and bridge portions that connect the first door portion and the second door portion with each other, thereby opening and closing a plurality of vents by the single mode door, reducing the number of components, weight and manufacturing costs by simplifying the entire structure of the mode door because it uses the single plate member, reducing the size of the air conditioner, preventing bad smells caused by inhabitation of molds and being reusable due to the use of the single plate member, and preventing the door from being caught because the plate member has bent portions formed at end portions thereof.

To accomplish the above object, according to the present invention, there is provided an air conditioner for a vehicle including: an air-conditioning case having a defrost vent, a face vent, and a floor vent for discharging air blown from a blower; an evaporator and a heater core mounted on air passageways inside the air-conditioning case; and a mode door having a gear shaft mounted inside the air-conditioning case and a plate member slidably engaging with the gear shaft for opening and closing the vents, wherein. the plate member includes: a first door portion for closing at least two vents out of the vents; a second door portion spaced apart from the first door portion at a predetermined interval in a sliding direction and adapted to close at least one vent out of the vents; and bridge portions adapted to connect the first door portion and the second door portion with each other.

According to the present invention, because the air conditioner for the vehicle includes the mode door of the single plate member having the first door portion that closes at least two vents, the second door portion that closes one vent, and the bridge portions that connect the first door portion and the second door portion with each other, the air conditioner can open and close the plural vents by the single mode door, reduce the number of components, weight and manufacturing costs by simplifying the entire structure of the mode door, and reduce the size of the air conditioner.

Moreover, the air conditioner according to the present invention can prevent bad smells caused by inhabitation of molds and is reusable due to the use of the single plate member.

Furthermore, the air conditioner according to the present invention can prevent bending or transformation caused by air pressure because the plate member has bead portions, and can prevent interference between the first and second door portions and the vents while the first and second door portions slide even though the plate member is bent by the air pressure because the first and second door portions respectively have bent portions.

Additionally, because a space between gear slots formed on the plate member is greater than the width of one gear slot, preferably, is at least 3 mm and more, and hence, the plate member is not cut and has an improved durability.

In addition, because the area where the first door portion engages with the gear portions of the gear shaft is increased due to extension portions formed on the first door portion, the gear shaft can be mounted more freely since the mounting position of the gear shaft can be moved downward to a wider space (downward in the sliding direction).

Moreover, because receiving portions are formed along the sliding direction of the plate member in the dead zones of the air-conditioning case to receive the end portion of the plate member, there is no need to increase the size of the air conditioner to cause a sliding motion of the plate member and the plate member can be operated without any influence of air that flows inside the air-conditioning case.

Furthermore, side wall surfaces of the receiving portions have the same curvature as the plate member and smoothly guide the end portion of the plate member inserted into the receiving portions.

Additionally, because fastening portions for the left and right cases of the air-conditioning case are formed on one side of the entrances of the receiving portions, the end portion of the plate member can smoothly slide in and out the receiving portions.

In addition, because the fastening portions formed at the entrances of the receiving portions support the plate member guided along the side wall surfaces inside the receiving portions, it can prevent vibration and noise of the end portion of the plate member generated when a strong wind is applied to the air-conditioning case or when there is an irregular air flow.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will be now made in detail to the preferred embodiment of the present invention with reference to the attached drawings.

An air conditioner 100 for a vehicle according to the present invention includes: an air-conditioning case 110 having an air inflow port 111 formed on one side thereof for introducing air blown from a blower 105 into the air-conditioning case 110 and a defrost vent 12a, a face vent 12b and floor vents 12c and 12d mounted on the other side thereof in such a way as to discharge the air introduced through the air inflow port 111 to the inside of the vehicle; an evaporator 101 and a heater core 102 that are mounted on air passageways in the air-conditioning case 110 and spaced apart from each other at a predetermined interval; a temperature-adjusting door 120 mounted between the evaporator 101 and the heater core 102 for adjusting the degree of opening of a cold air passageway P1, which bypasses the heater core 102, and a warm air passageway P2, which passes through the heater core 102; and a mode door 130 mounted inside the air-conditioning case 110 for opening and closing the various vents 112, 113 and 114.

In the meantime, the air-conditioning case 110 has different structures according to the kinds of air conditioners, such as center-mounting type air conditioners, semi-center type air conditioners, three-piece type air conditioners, independent type air conditioners, and so on. Such an air-conditioning case 110 is divided into a left case (not shown) and a right case 110a, and in this instance, the air-conditioning case has a plurality of fastening portions 117 formed at dead zones of the left and right cases 110a, such that the left and right cases 110a can be screw-coupled and assembled with each other.

Moreover, the air-conditioning case 110 has the blower 105 mounted on an upstream side of the evaporator 101 in an air flow direction, and the defrost vent 112, the face vent 113 and the floor vent 114 formed on a downstream side of the evaporator 101 and the heater core 102.

The blower 105 includes; a scroll case 106 communicatingly connected with the air inflow port 111 of the air-conditioning case 110; a blower fan 107 mounted inside the scroll case 106 for forcedly sending air to the inside of the air-conditioning case 110; and an intake duct (not shown) mounted on one side of the scroll case 106 and selectively opening and closing an inside air inlet and an outside air inlet by an inside and outside air converting door (not shown) to thereby selectively introduce the inside air and the outside air.

Accordingly, the blower 105 selectively introduces the inside air and the outside air through the intake duct and blows the introduced air to the inside of the air-conditioning case 110.

Figure 3:
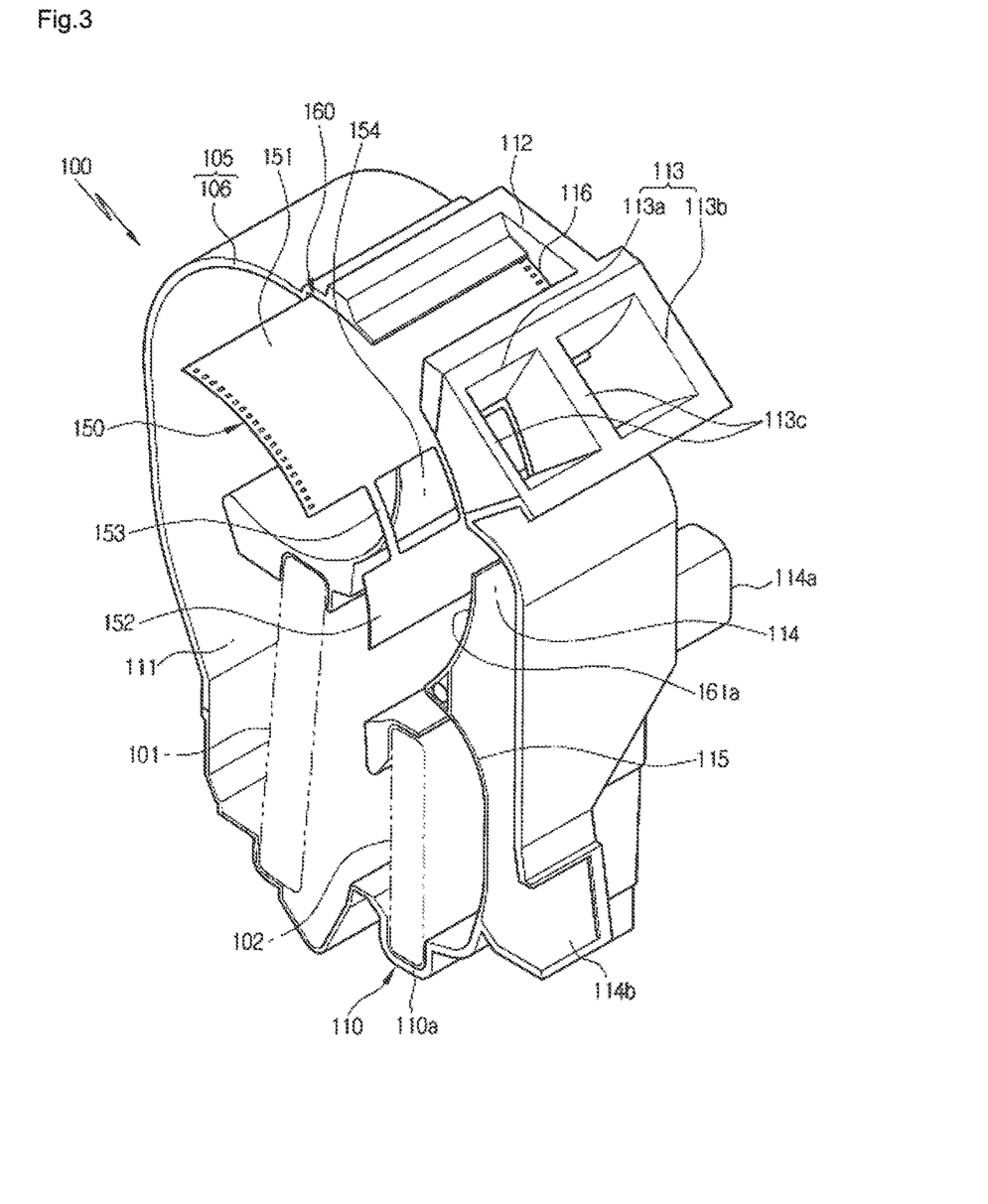
FIG. 3 is a perspective view showing an exploded state of a center-mounting type air conditioning case of an air conditioner for a vehicle according to the present invention.
Figure 7:
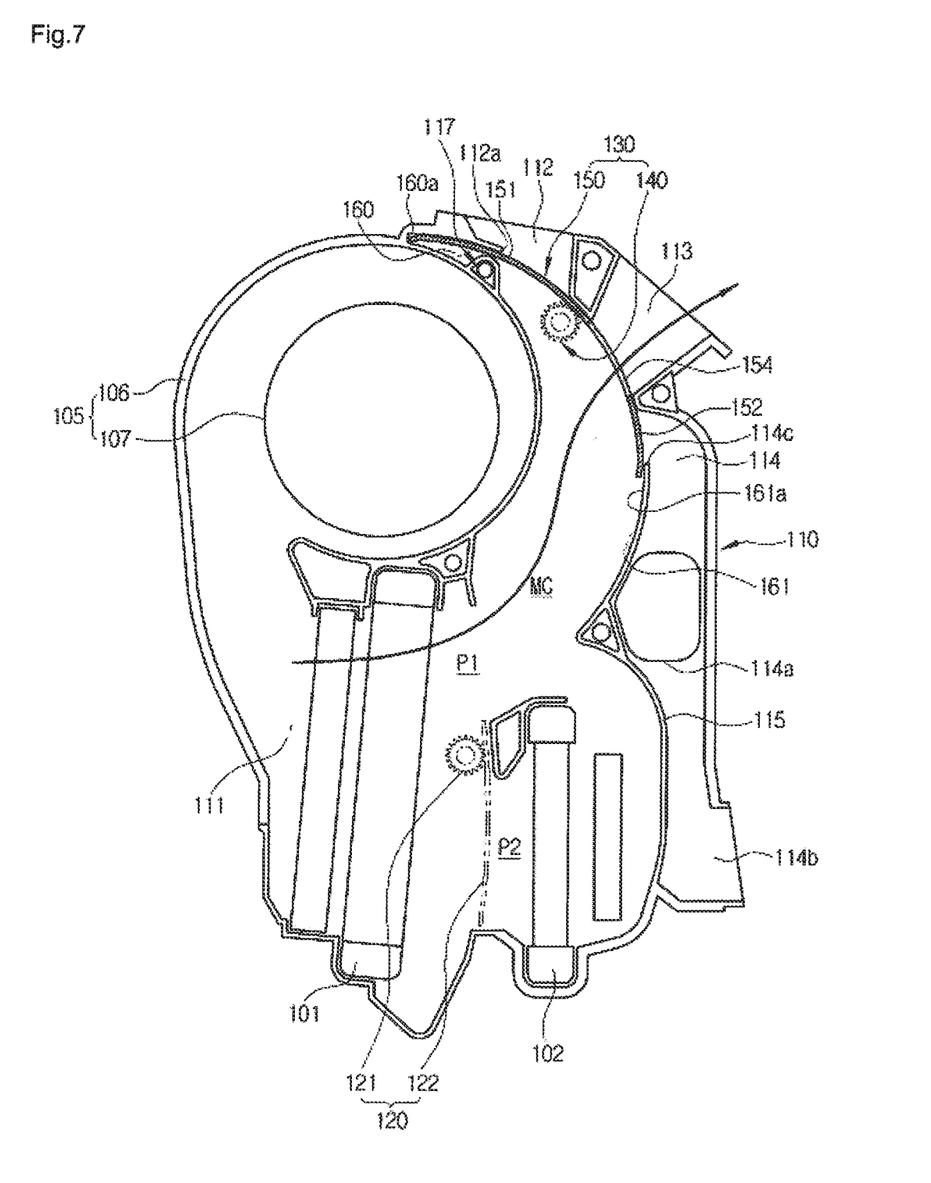
FIGS. 7 to 11 are views illustrating operational states of the mood door by air conditioning modes in the air conditioner according to the present invention.

In the center-mounting type air conditioner illustrated in FIGS. 3 and 7, the blower 105 is arranged at the center of the vehicle together with the air-conditioning case 110, and in this instance, the scroll case 106 connected with the air inflow port 111 of the air-conditioning case 110 is arranged above the evaporator 101.

Figure 12:
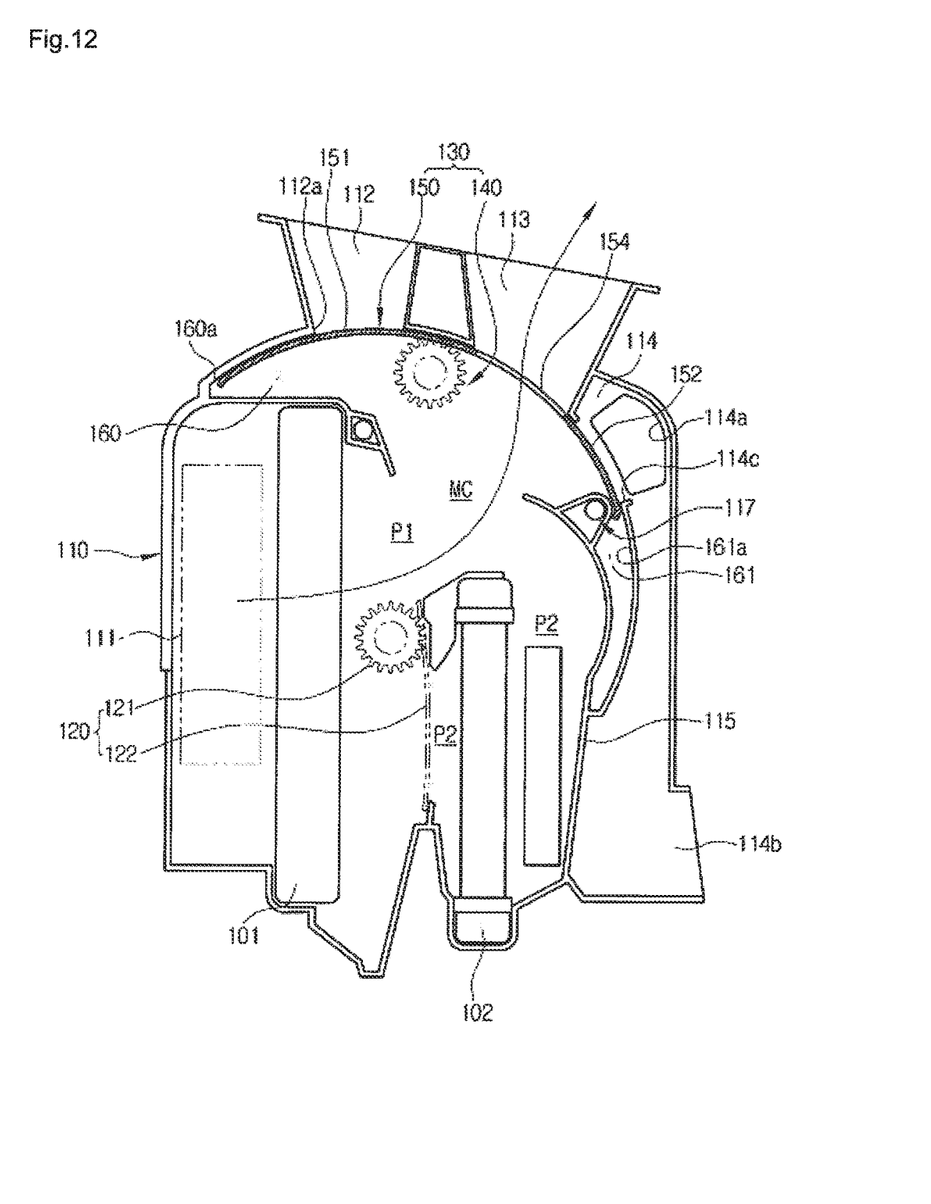
FIG. 12 is a sectional view of a semi-center type air conditioning case of the air conditioner according to the present invention.

In the semi-center type air conditioner illustrated in FIG. 12, the blower 105 is arranged on a passenger seat, which is one side of the air-conditioning case 110, and the scroll case (not shown) connected with the air inflow port 111 of the air-conditioning case 110 is arranged on one side of the air-conditioning case 110 in a lateral direction of the evaporator 101.

The air introduced into the air-conditioning case 110 by the blower 105 is discharged to specific inside parts of the vehicle through the vents 112, 113 and 114, wherein the defrost vent 112 discharges the air toward the front window of the vehicle, the face vent 113 discharges the air toward the face of a passenger, who sits on the front seat, and the floor vent 114 discharges the air toward the passenger's feet.

The face vent 113 is divided into a center vent 113a and side vents 113b, wherein the center vent 113a is formed at the center of the inside of the face vent 113 for discharging the air to the center of the inside of the vehicle, and the side vents 113b are formed at both sides of the center vent 113a for discharging the air to both sides of the inside of the vehicle. In this instance, the center vent 113a and the side vents 113b are partitioned from each other by a plurality of partition walls 113c.

The center vent 113a also has a partition wall 113c formed at the center of the inside thereof. As described above, the face vent 113 has total three partition walls 113c: two partition walls 113c for partitioning the center vent 113a from the side vents 113b formed at both sides of the center vent 113a; and the other partition wall 113c being formed at the center of the center vent 113a.

Furthermore, the floor vent 114 is divided into a floor vent 114a for the front seat to discharge the air toward the feet of the passenger, who sits on the front seat, and a floor vent 114b for the rear seat to discharge the air toward the feet of the passenger, who sits on the rear seat.

Meanwhile, another partition wall 115 is formed between the warm air passageway P2, which is located at the rear of the heater core 102, and a mixing chamber MC, where cold air and warm air are mixed, and the floor vent 114 to partition the warm air passageway P2 and the mixing chamber MC from the floor vent 114.

Additionally, the temperature-adjusting door 120 and the mode door are rotatably connected to an actuator (not shown), which is mounted on the outer surface of the air-conditioning case 110, to thereby adjust the degree of opening of the cold and warm air passageways P1 and P2 and the vents 112, 113 and 114.

The mode door 130 includes: a gear shaft 140 mounted inside the air-conditioning case 110; and a plate member 150 slidably engaging with the gear shaft 140 for opening and closing the vents 112, 113 and 114.

The gear shaft 140 has gear portions 141 respectively formed at both end portions thereof, and end portions of the gear shaft 140, which are located more outward than the gear portions 141, are rotatably joined to both inner sides of the air-conditioning case 110.

In addition, the air-conditioning case 110 has guide rail grooves 116 formed on both inner sides thereof for slidably supporting both end portions of the plate member 150.

The guide rail grooves 116 are formed with a predetermined curvature in a direction of the gear shaft 140 and are all in contact with inlet sides of the vents 112, 113 and 114.

Accordingly, the plate member 150 can open and close the vents 112, 113 and 114 while sliding along the guide rail grooves 116.

Figure 4:
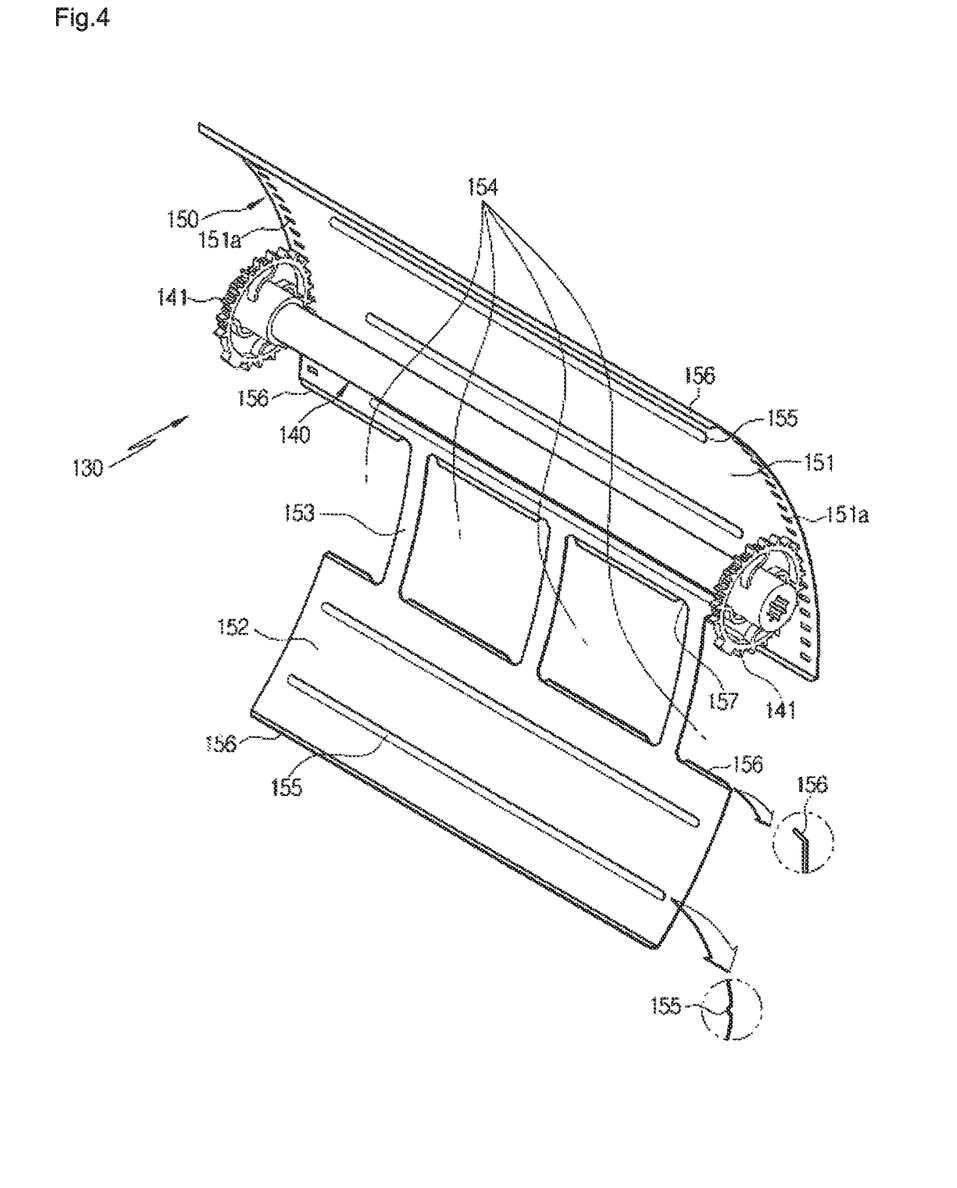
FIG. 4 is a perspective view of a mode door of the air conditioner for the vehicle according to the present invention.
Figure 5:
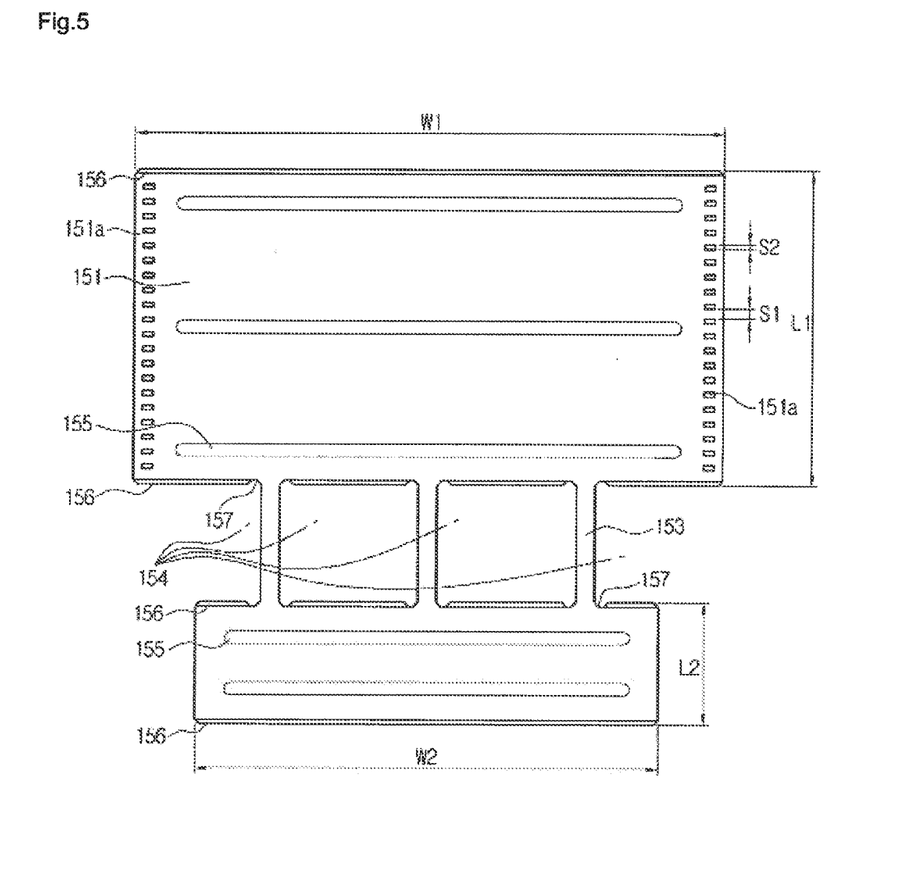
FIG. 5 is a view illustrating a state where a plate member is spread in the air conditioner according to the present. invention.

Moreover, the plate member 150 includes a first door portion 151, a second door portion 152, and bridge portions 153, and in this instance, the first door portion 151, the second door portion 152, and the bridge portions 153 are formed integrally with one another within a predetermined radius.

In other words, the first door portion 151, the second door portion 152, and the bridge portions 153 of the plate member 150 are in an integral form and formed within the predetermined radius, so that the plate member 150 can keep the predetermined curvature without bending during a sliding motion.

Furthermore, it is preferable that the plate member 150 is made of a single material and is 0.3 T to 1.2 T thick to reduce weight and manufacturing costs and to smoothly move along the guide rail grooves 116.

As described above, because the first door portion 151, the second door portion 152 and the bridge portion 153 are integrally formed of the single material to thereby simplify the entire structure of the mode door 130, it can reduce the number of components, weight and manufacturing costs of the mode door 130, improve durability, reduce the size of the air conditioner, and prevent bad smells, which are caused by inhabitation of molds, and is reusable due to the use of the plate member 150 made of the single material.

In the meantime, the plate member 150 may be made of a thin film material.

Moreover, the first door portion 151 can close at least two of the defrost vent 112, the face vent 113 and the floor vent 114. That is, a sliding direction length L1 of the first door portion 151 is as long as the first door portion 151 can close the two adjacent vents out of the vents 112, 113 and 114 at the same time, and of course, when the first door portion 151 rotates in the counterclockwise direction to the maximum, it can close only one vent, namely, the defrost vent 112.

Meanwhile, the first door portion 151 is formed as long as it can simultaneously close the defrost vent 112 and the face vent 113 or simultaneously close the face vent 113 and the floor vent 114.

The second door portion 152 is spaced apart from the first door portion at a predetermined interval in the sliding direction, and closes at least one vent of the vents 112, 113 and 114.

In other words, a sliding direction length L2 of the second door portion 152 is formed as long as it can close one vent out of the vents 112, 113 and 114, and in this instance, it is preferable that the second door portion 152 is as large as it can close the floor vent 114.

As described above, the sliding direction length L1 of the first door portion 151 that has to close two vents out of the vents 112, 113 and 114 is longer than the sliding direction length L2 of the second door portion 152 that has to close one vent out of the vents 112, 113 and 114.

Furthermore, a width W2 of the second door portion 152 in an axial direction of the gear shaft 140 is smaller than a width W1 of the first door portion 151.

That is, a vehicle structure (not shown) is installed adjacent to both sides of the floor vent 114 of the air-conditioning case 110, where the floor vent 114 is located, and in this instance, the floor vent 114 is narrower than the defrost vent 112 and the face vent 113 as illustrated in FIG. 3 in order to prevent interference between the vehicle structure and the floor vent 114, and hence, the width W2 of the second door portion 152, which closes the floor vent 114, is smaller than the width W1 of the first door portion 151, which closes the defrost vent 112 and the face vent 113.

If the width of the floor vent 114 is equal to the width of the defrost vent 112 and the face vent 113, the width W2 of the second door portion 152 is also equal to the width W1 of the first door portion 151.

Additionally, the bridge portions 153 are respectively formed at positions corresponding to the plural partition walls 113c, which are formed inside the face vent 113 for partitioning the center vent 113a from the side vent 113b.

As described above, because the three partition walls 113c are formed inside the face vent 113, three bridge portions 153 are also formed, and the bridge portions 153 are closely formed under the three partition walls 113c.

Moreover, the plate member 150 further includes open portions 154 formed between the first door portion 151 and the second door portion 152 to open at least one vent out of the vents 112, 113 and 114 according to the sliding position of the plate member 150.

The open portions 154 are formed by the bridge portions 153 that connect the first door portion 151 and the second door portion 152 with each other, and are dividedly formed between the plural bridge portions 153.

In the meantime, it is preferable that each of the open portions 154 is as large as it can open one vent, and in this instance, in the case that the open portion 154 lays across the two vents, the open portion 154 can partially open the two vents.

Furthermore, bent portions 156 bent at a predetermined angle in the direction of the gear shaft 140 are formed at sliding-directional end portions of the first door portion 151 and the second door portion 152.

In other words, when the bent portions 156 are formed inwardly at the end portions of the first and second door portions 151 and 152, even though the plate member 150 is partially transformed by air pressure moving inside the air-conditioning case 110, the first and second door portions 151 and 152 are not caught to the vents 112, 113 and 114 during the sliding motion.

Additionally, it is preferable that the plate member 150 has bead portions 155 formed by bending the surface of the plate member 150 to prevent transformation by the inside air pressure of the air-conditioning case 110.

It is preferable that the bead portions 155 are formed at the sliding-directional end portions and the central portions of the first door portion 151 and the second door portion 152.

In addition, each of the bridge portions 153 connected with the first and second door portions 151 and 152 has concave portions 157 formed at both ends thereof to smoothly bend the bent portions 156 and to prevent the bridge portion 153 from being torn.

Each of the concave portions 157 is in a semi-circular form.

Moreover, the first door portion 151 has a plurality of gear slots 151a that are formed at both end portions thereof and are spaced apart from each other at a predetermined interval in the sliding direction of the plate member 150 in such a way as to engage with the gear portions 141 of the gear shaft 140.

An interval S1 between the gear slots 151a is larger than a width S2 of one gear slot 151a to thereby prevent the plate member 150 from being cut. In this instance, it is preferable that the interval S1 between the gear slots 151a is at least 3 mm and more in order to prevent the plate member 150 from being cut.

Figure 6:
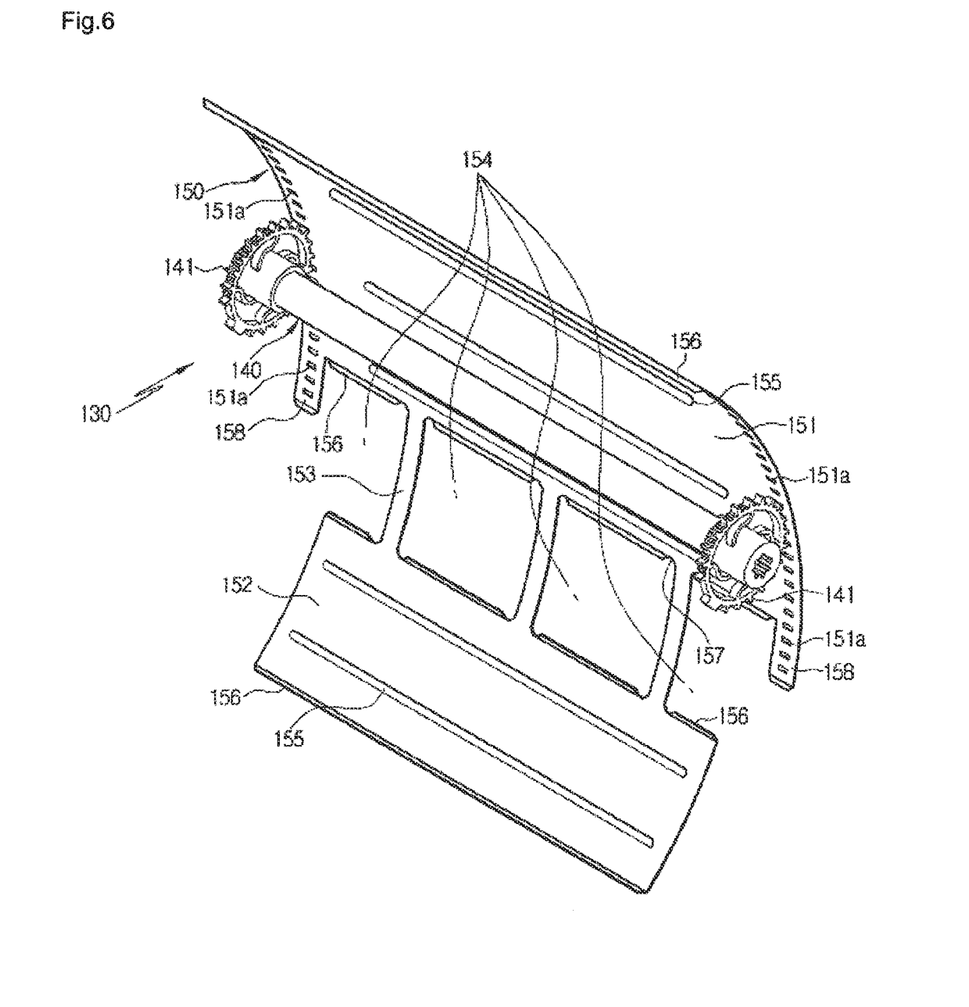
FIG. 6 is a perspective view illustrating a state where an extension portion is formed on a first door part in the air conditioner according to the present invention.

Furthermore, the first door portion 151 has extension portions 158 formed on one end portion thereof, which faces the second door portion 152, and the extension portions 158 extend toward the second door portion 152 to a predetermined length and respectively have a plurality of gear slots 151a perforated thereon to extend an area where the first door portion 151 engages with the gear portions 141 of the gear shaft 140.

Due to the extension portions 158, the number of the gear slots 151a formed on the first door portion 151 increases in the sliding direction, so that the area where the first door portion 151 engages with the gear portions 141 of the gear shaft 140 is also increased.

As described above, when the area where the first door portion 151 engages with the gear portions 141 of the gear shaft 140 is increased due to the extension portions 158 formed on the first door portion 151, the gear shaft 140 can be mounted more freely because the mounting position of the gear shaft 140 can be moved downward to a wider space (downward in the sliding direction).

Additionally, the air-conditioning case 110 has receiving portions 160 and 161 formed therein and extending from an inlet 112a of the defrost vent 112 or an inlet 114c of the floor vent 114 to a predetermined length along the sliding direction of the plate member 150 for receiving an end portion of the plate member 150 therein.

In this instance, the receiving portion 160 extending from the inlet 112a of the defrost vent 112 along the sliding direction of the plate member 150 receives the end portion of the plate member 150 in such a way that the end portion of the plate member 150 can slide in and out. In the case of the center-mounting type air conditioner illustrated in FIG. 7, the receiving portion 160 is formed at a dead zone area between the scroll case 106 and the defrost vent 112, but in the case of the semi-center type air conditioner illustrated in FIG. 12, the receiving portion 160 is formed at a dead zone area between the evaporator 101 and the defrost vent 112.

In addition, the receiving portion 161 extending from the inlet 114c of the floor vent 114 along the sliding direction of the plate member 150 receives the end portion f the plate member 150 in such a way that the end portion of the plate member 150 can slide in and out. In the case of the center-mounting type air conditioner illustrated in FIG. 7, the receiving portion 160 is formed at one side area of the mixing chamber (MC) where cold and warm airs are mixed, but in the case of the semi-center type air conditioner illustrated in FIG. 12, the receiving portion 160 is formed at a dead zone area between the downstream side warm air passageway P2 of the heater core 102 and the floor vent 114.

As described above, because the receiving portions 160 and 161 of the plate member 150 are formed at the dead zones of the air-conditioning case 110, there is no need to increase the size of the air conditioner to cause a sliding motion of the plate member 150 and the plate member 150 can be operated without any influence of air that flows inside the air-conditioning case 110.

Meanwhile, the receiving portions 160 and 161 are formed in such a way as to get gradually narrower from an entrance side toward ends thereof.

Moreover, side wall surfaces 160a and 161a of the receiving portions 160 and 161 have the same curvature as the plate member 150 and smoothly guide the end portion of the plate member 150 inserted into the receiving portions 160 and 161.

Furthermore, the fastening portions 117 for the left and right cases 110a of the air-conditioning case 110 are formed on one side of the entrances of the receiving portions 160 and 161, so that the end portion of the plate member 150 can smoothly slide in and out the receiving portions 160 and 161.

In this instance, it is preferable that the fastening portions 117 formed at the entrances of the receiving portions 160 and 161 are formed in a circular shape.

Additionally, because the fastening portions 117 formed at the entrances of the receiving portions 160 and 161 support the plate member 150 guided along the side wall surfaces 160a and 161a inside the receiving portions 160 and 161, it can prevent vibration and noise of the end portion of the plate member 150 generated when a strong wind is applied to the air-conditioning case 110 or when there is an irregular air flow.

In the meantime, the temperature-adjusting door 120 mounted between the evaporator 101 and the heater core 102 may include a gear shaft 121 and a plate member 122 like the mode door 130 in order to reduce the size of the air conditioner 100. In other words, the temperature-adjusting door 120 includes: the gear shaft 121 rotating by an actuator (not shown); and the plate member 122 engaging with the gear shaft 121 and adjusting the degree of opening of the cold air passageway P1 and the warm air passageway P2 while vertically sliding inside the air-conditioning case 110 when the gear shaft 121 rotates.

Hereinafter, air-conditioning modes of the air conditioner for the vehicle according to the present invention will be described, and in this instance, for convenience's sake, the description will be made on the basis of a cooling mode of the center-mounting type air conditioner.

A. Face Mode

As shown in FIG. 7, in the face mode, by the rotational operation of the gear shaft 140, the first door portion 151 of the plate member 150 closes the defrost vent 112 and the second door portion 152 closes the floor vent 114, and in this instance, the open portion 154 of the plate member 150 is located at the face vent 113 and opens the face vent 113.

Here, one end portion of the plate member 150 (one end portion of the first door portion 151) is inserted and accommodated into the receiving portion 160 formed between the scroll case 106 and the defrost vent 112.

Therefore, air blown by the blower 105 is converted into cold air while passing through the evaporator 101.

The air cooled while passing through the evaporator 101 bypasses the heater core 102 by the temperature-adjusting door 120, and then, is discharged toward the face of the passenger, who sits inside the vehicle, through the face vent 113 opened by the plate member 150.

B. Floor Mode

Figure 8:
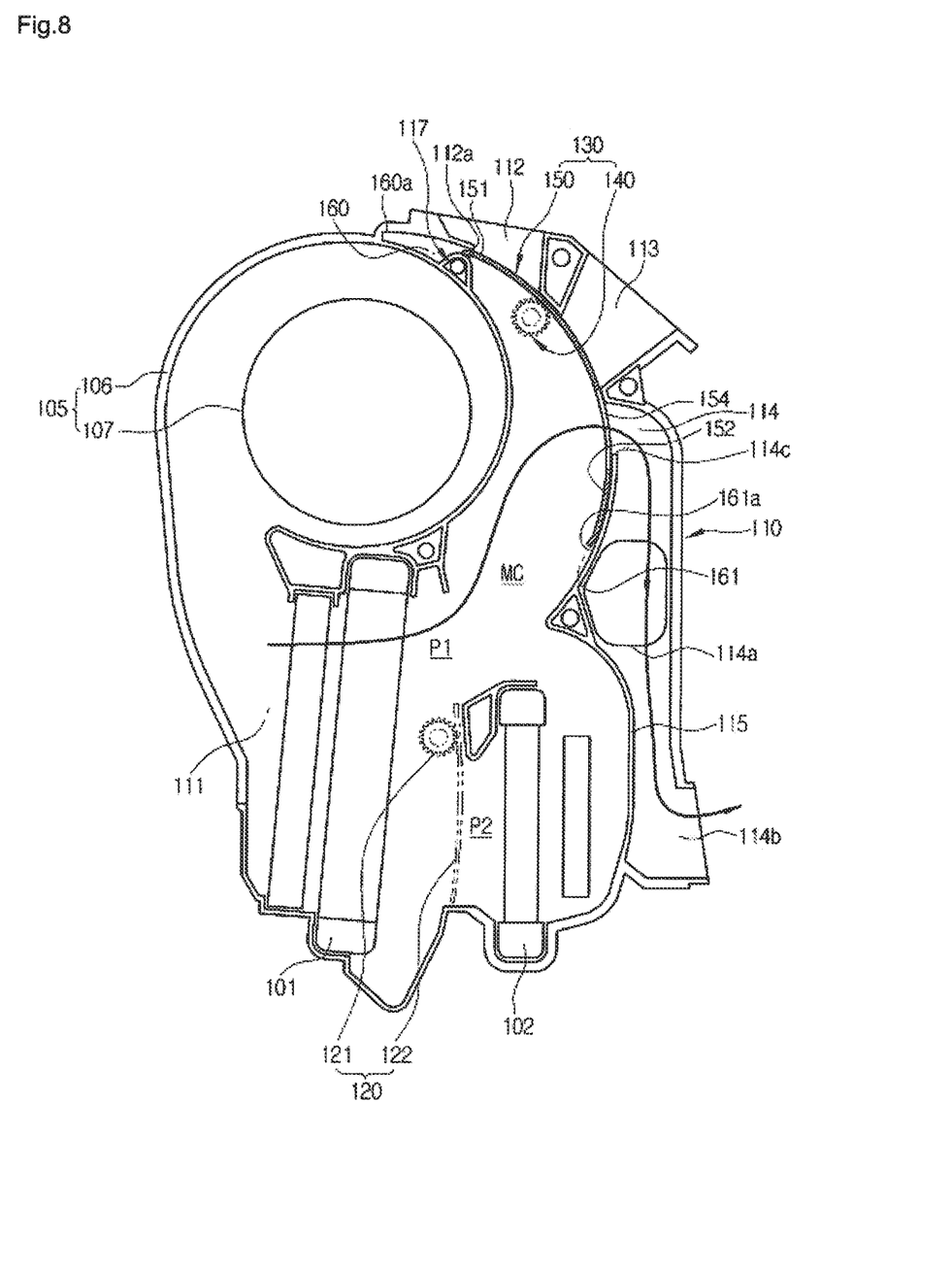

In the floor mode, as shown in FIG. 8, when the gear shaft 140 rotates from the position of the face mode at a predetermined angle in the clockwise direction, the first door portion 151 of the plate member 150 simultaneously closes the defrost vent 112 and the face vent 113, and in this instance, the open portion 154 of the plate member 150 is located at the floor vent 114 and opens the floor vent 114.

Here, the other end portion of the plate member 150 (the second door portion 152) is guided to go down along the wall surface 161a of the receiving portion 161 in the mixing chamber MC.

Therefore, air blown by the blower 105 is converted into cold air while passing through the evaporator 101.

The air cooled while passing through the evaporator 101 bypasses the heater core 102 by the temperature-adjusting door 120, and then, is discharged toward the face of the passenger, who sits inside the vehicle, through the floor vent 114 opened by the plate member 150.

C. Defrost Mode

Figure 9:
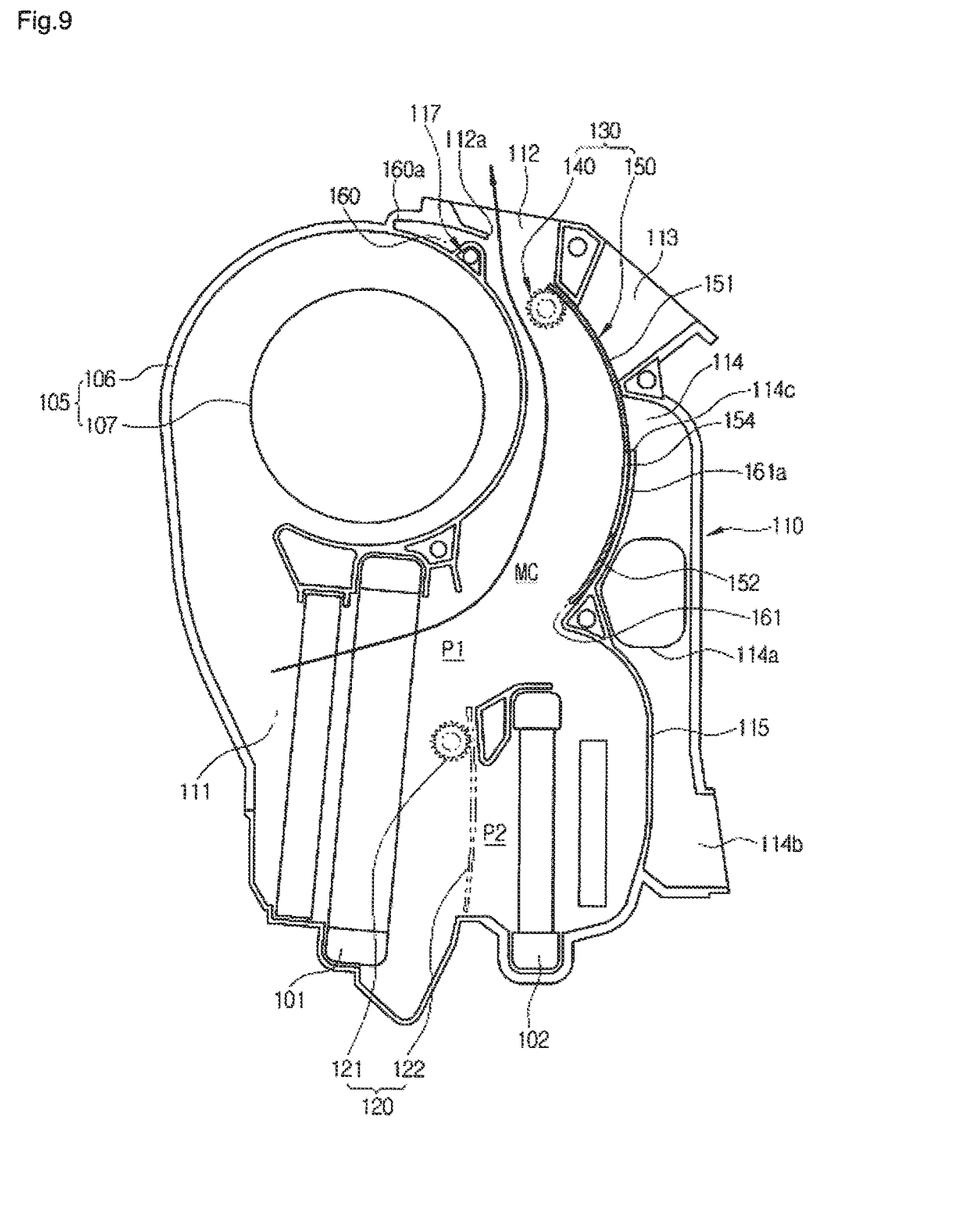

In the defrost mode, as shown in FIG. 9, when the gear shaft 140 rotates more from the position of the floor mode at a predetermined angle in the clockwise direction, the first door portion 151 of the plate member 150 simultaneously closes the face vent 113 and the floor vent 114, and in this instance, the first door portion 151 gets out of the defrost vent 112, and hence, the defrost vent 112 is opened.

Here, the other end portion of the plate member 150 (the second door portion 152) is guided to go down more than the end portion of the plate member 150, which is in the floor mode, along the wall surface 161a of the receiving portion 161 in the mixing chamber MC.

Therefore, air blown by the blower 105 is converted into cold air while passing through the evaporator 101.

The air cooled while passing through the evaporator 101 bypasses the heater core 102 by the temperature-adjusting door 120, and then, is discharged toward the inside window of the vehicle through the defrost vent 112 opened by the plate member 150 to thereby defrost the window.

D. Bi-level Mode & Mix Mode

Figure 10:
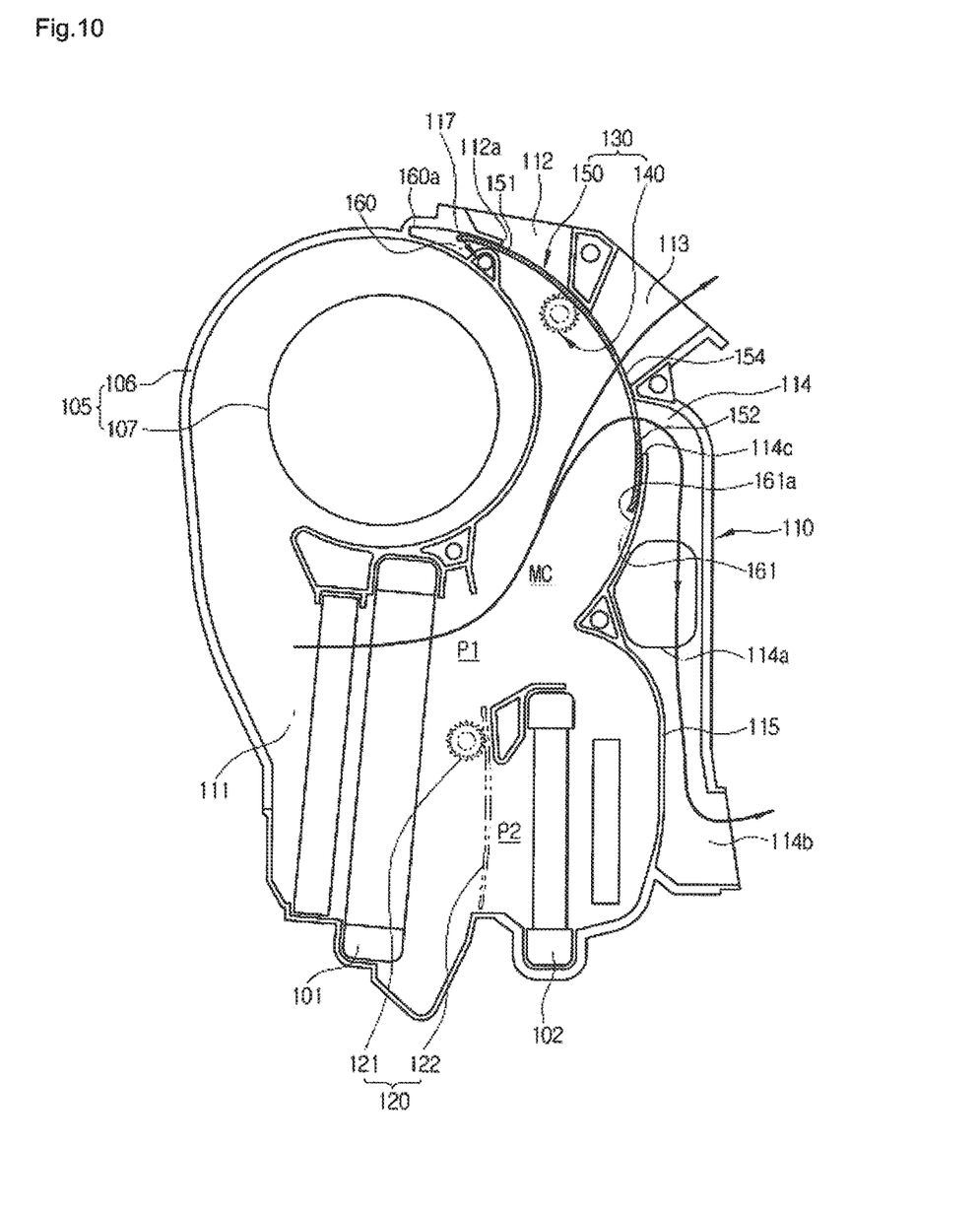

Referring to FIG. 10, the bi-level mode will be described in brief. The bi-level mode is to simultaneously open the face vent 113 and the floor vent 114 by the open portion 154 of the plate member 150 laid across the face vent 113 and the floor vent 114.

Figure 11:
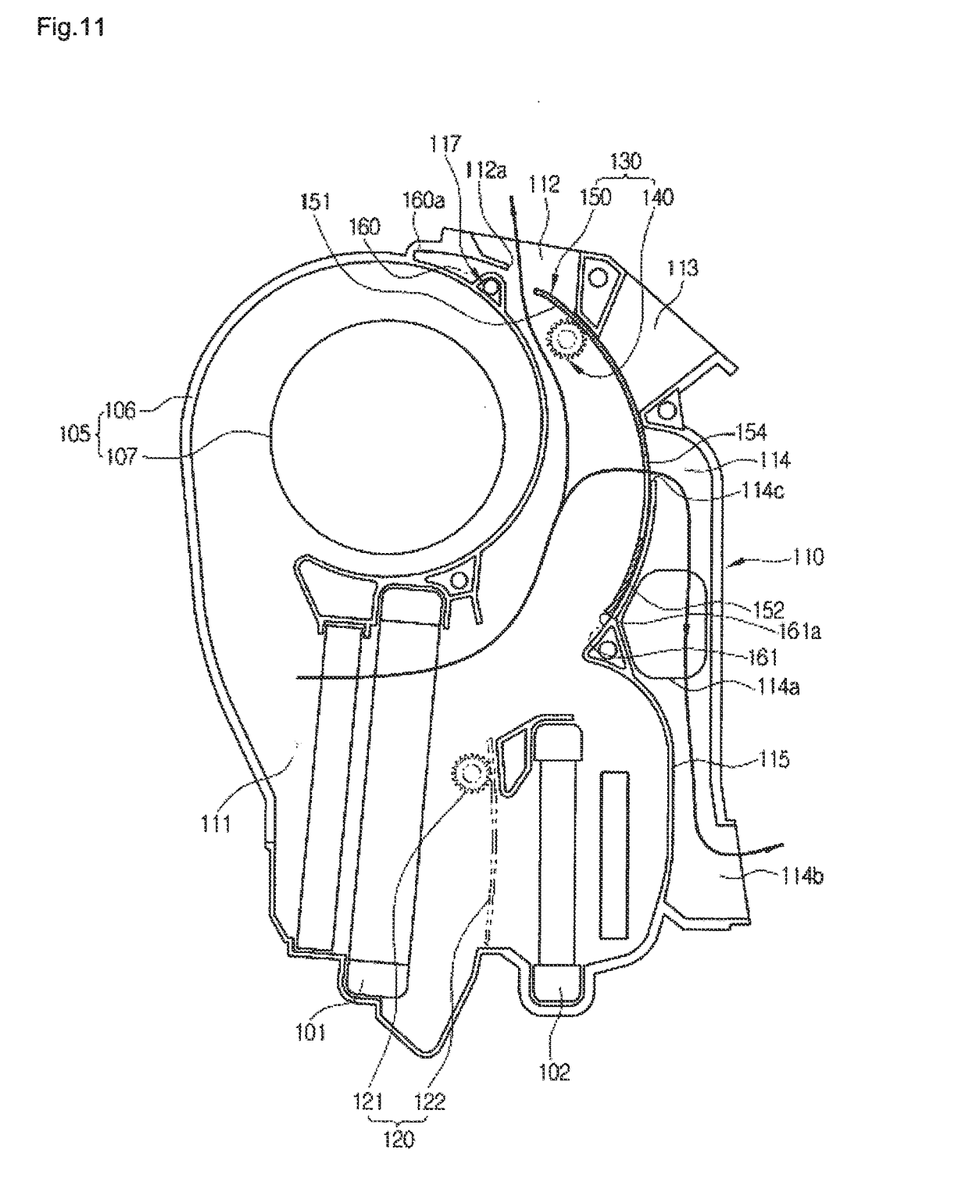

Moreover, as shown in FIG. 11, the mix mode is to close the face vent 113 and simultaneously open the defrost vent 112 and the floor vent 114 by locating the center of the first door portion 151 of the plate member 150 at the face vent 113.

As described above, while the structure of the plate member 150 of the present invention applied to the center-mounting type air conditioners and the semi-center type air conditioners is described in this specification, the plate member 150 is not restricted to the above but may be applied to various air conditioners, such as three-piece type air conditioners and independent type air conditioners, in the same way, and it can provide the same effects as the plate member 150 applied to the center-mounting type air conditioners and the semi--center type air conditioners.

What is claimed is:

1. An air conditioner for a vehicle comprising: an air-conditioning case having a defrost vent, a face vent, and a floor vent for discharging air blown from a blower; an evaporator and a heater core mounted on air passageways inside the air-conditioning case; and a mode door having a gear shaft mounted inside the air-conditioning case and a plate member slidably engaging with the gear shaft for opening and closing the vents, wherein the plate member comprises: a first door portion for closing at least two vents out of the vents; a second door portion spaced apart from the first door portion at a predetermined interval in a sliding direction and adapted to close at least one vent out of the vents; and bridge portions adapted to connect the first door portion and the second door portion with each other, wherein the plate member further comprises open portions formed between the first door portion and the second door portion to open at least one vent out of the vents according to the sliding position of the plate member, wherein the face vent is divided into a center vent formed at the center thereof and side vents formed at both sides of the center vents by a plurality of partition walls, which are formed inside the face vent, and wherein the bridge portions are respectively formed at positions corresponding to the plural partition walls, wherein the gear shaft comprises gear portions formed at both end portions thereof and the first door portion has a plurality of gear slots that are formed at both end portions of the first door portion and are spaced apart from each other at a predetermined interval in the sliding direction of the plate member in such a way as to engage with the gear portions of the gear shaft, and wherein an interval between the gear slots is larger than a width of one gear slot to thereby prevent the plate member from being cut, wherein a width of the second door portion is smaller than a width of the first door portion in an axial direction of the gear shaft, and the end portions of the first door portion and of the second door portion in an axial direction of the gear shaft do not connect, wherein the first door portion comprises extension portions formed on one end portion thereof, which faces the second door portion, the extension portions extending to a predetermined length toward the second door portion and respectively having a plurality of gear slots perforated thereon to extend an area engaging with the gear portions of the gear shaft.

2. The air conditioner according to claim 1, wherein bent portions bent at a predetermined angle in the direction of the gear shaft are formed at sliding-directional end portions of the first door portion and the second door portion, so that the first and second door portions are not caught to the vents during the sliding motions of the first and second door portions.

3. The air conditioner according to claim 2, wherein each of the bridge portions connected with the first and second door portions comprises concave portions formed at both ends thereof to smoothly bend the bent portions and to prevent the bridge portion from being torn.

4. The air conditioner according to claim 1, wherein a sliding direction length of the first door portion is larger than a sliding direction length of the second door portion.

5. The air conditioner according to claim 1, wherein the plate member comprises bead portions formed by bending the surface of the plate member to prevent transformation by the inside air pressure of the air-conditioning case.

6. The air conditioner according to claim 1, wherein the first door portion, the second door portion, and the bridge portions of the plate member are in an integral form and formed within the predetermined radius, so that the plate member can keep the predetermined curvature during the sliding motion.

7. The air conditioner according to claim 1, wherein the air-conditioning case comprises receiving portions formed therein, the receiving portions extending from an inlet of the defrost vent or an inlet of the floor vent to a predetermined length along the sliding direction of the plate member for receiving an end portion of the plate member therein.

8. The air conditioner according to claim 7, wherein the blower comprises a scroll case communicatingly connected with the air-conditioning case and a blower fan mounted inside the scroll case for sending air to the inside of the air-conditioning case.

9. The air conditioner according to claim 8, wherein the blower is arranged above the evaporator, and the receiving portion extending from the inlet of the defrost vent along the sliding direction of the plate member is formed at a dead zone area between the scroll case of the blower and the defrost vent.

10. The air conditioner according to claim 7, wherein the blower is arranged on the side surface of the air-conditioning case, and the receiving portion extending from the inlet of the defrost vent along the sliding direction of the plate member is formed at a dead zone area between the evaporator and the defrost vent.

11. The air conditioner according to claim 7, wherein the receiving portion extending from the inlet of the floor vent along the sliding direction of the plate member is formed at a dead zone area between the downstream side warm air passageway of the heater core and the floor vent.

12. The air conditioner according to claim 7, wherein the receiving portion extending from the inlet of the floor vent along the sliding direction of the plate member is formed at one side area of the mixing chamber where cold air passing through the evaporator and warm air passing through the heater core are mixed.

13. The air conditioner according to claim 7, wherein side wall surfaces of the receiving portions have the same curvature as the plate member to guide the plate member.

14. The air conditioner according to claim 7, wherein fastening portions for left and right cases of the air-conditioning case are formed on one side of entrances of the receiving portions, so that the plate member can smoothly slide in and out the receiving portions.

* * * * *